FERENCE EXAMIN 3,521,168

455-4

NATIONAL WARNING SYSTEM OPERABLE FROM CENTRAL STATION

Filed March 9, 1966

July 21, 1970 E. F. KAISER ET AL 3,521,168

NATIONAL WARNING SYSTEM OPERABLE FROM CENTRAL STATION

Filed March 9, 1966 7 Sheets-Sheet 6

United States Patent Office 3,521,168
Patented July 21, 1970

3,521,168

NATIONAL WARNING SYSTEM OPERABLE FROM CENTRAL STATION

Edward F. Kaiser, 109 Boone Highway 40222, and Stuart H. Gates, 4309 Taylorsville Road 40220, both of Louisville, Ky.

Filed Mar. 9, 1966, Ser. No. 532,934
Int. Cl. H04h *1/00, 1/08*
U.S. Cl. 325—53 16 Claims

ABSTRACT OF THE DISCLOSURE

A telecommunication system whereby emergency audio and/or video information can be transmitted from a central control point to all or part of the country. A unique pulse control signal is generated at a central point and communicated to existing radio and other transmitting stations to cause the stations to be disconnected from their regular broadcast sources and connected to lines carrying audio and video information from the central point. The control signals can be employed to activate a transmitting station which is not operating and the signals can be likewise used to increase the volume of the audio transmitted. Further, an arrangement whereby specially equipped telephones can be made to ring continuously when such unique control signals are transmitted is also disclosed.

This invention relates to a communication system. More specifically the invention relates to telecommunication system whereby audio and/or video information can be transmitted from a central control ponit to various regions of the country, either separately or concurrently.

A particular use of this invention might be the placing of the central control point in the White House whereby the President could communicate to the entire nation by the single operation of the instigating a uniquely coded sequence of tones or pulses from his own telephone dial, for example, and then relating to the nation any message which might be desired. Another use of the invention could be to place the central control system in the office of a plant manager or plant controller whereby all the employees having a telephone or the proper type of receivers could be placed in instantaneous communication with the central control point.

The specific use which we contemplate for this system is primarily as a national defense warning system. The central control point could be placed at any particular place in which the President resides. From this location he could, by the proper operational sequencing of a primary control signal, communicate with the entire nation or portions thereof, whereby he can transmit his message thereto over regular radio, television, telephone or pocket type receivers. By the use of this system then, he can be placed in instantaneous communication with a majority of the country's population.

Accordingly, it is an object of the present invention to provide a system for the telecommunication, whereby a central control point can instantaneously disseminate any information which is required to be known by the general population.

A further object of the present invention is the provision of a system of the type described having for its receivers, radio, television, telephone, presently found in a majority of homes and offices, and pocket type apparatus which may be conveniently carried by the average individual.

Another object of the present invention is the provision of a system of the type described which will enable the broadcasting and receiving equipment of the system to be turned on even though they may be in an off condition.

Still a further object of the present invention is the provision of a system of the type described, embodying a method by which a central control office can communicate with various sections of the system.

Still another object of the present invention is the provision of an apparatus of the type described having components, which upon their activation, will place the central control office in instant communication with the various parts thereof.

Still another object of the present invention is the provision of a novel system whereby a central control point can communicate with any person carrying a personal type receiver tuned to a pre-selected frequency and will thereby place the carrier thereof in instant communication with the central control point.

Still another object of the present invention is the provision of a novel system for disseminating information from a central control point, so that the general population can be warned of any impending dangers.

Still another object of the present invention is the provision of a system of the type described which is simple in construction, effective in operation, and economical to manufacture and maintain.

These and other objectives of the present invention will become more apparent during the course of the following detailed description and appended claims.

The invention may be best understood with reference to the accompanying drawings wherein an illustrative embodiment is shown.

The general operation of the system will now be described. When a person at the central control station wants to communicate with the entire network alarm system, he generates a specifically and uniquely coded signal which can be a series of pulses or a series of tones. These pulses or tones activate the various switching elements of the system whereby the regular program, which was being broadcast at the time, is eliminated from the regular broadcasting apparatus. Once this broadcasting apparatus is transferred in operation from the regular broadcasting system to the system controlled through the central office, the information which the central office wants to disseminate throughout the entire system can be originated from the central communication center and transmitted to all receivers capable or enabled to receive the program signal being generated at the central control point. It will be appreciated, therefore, that this invention will be useful in any national emergency in which priority information must be communicated to the general public.

Figure 1:
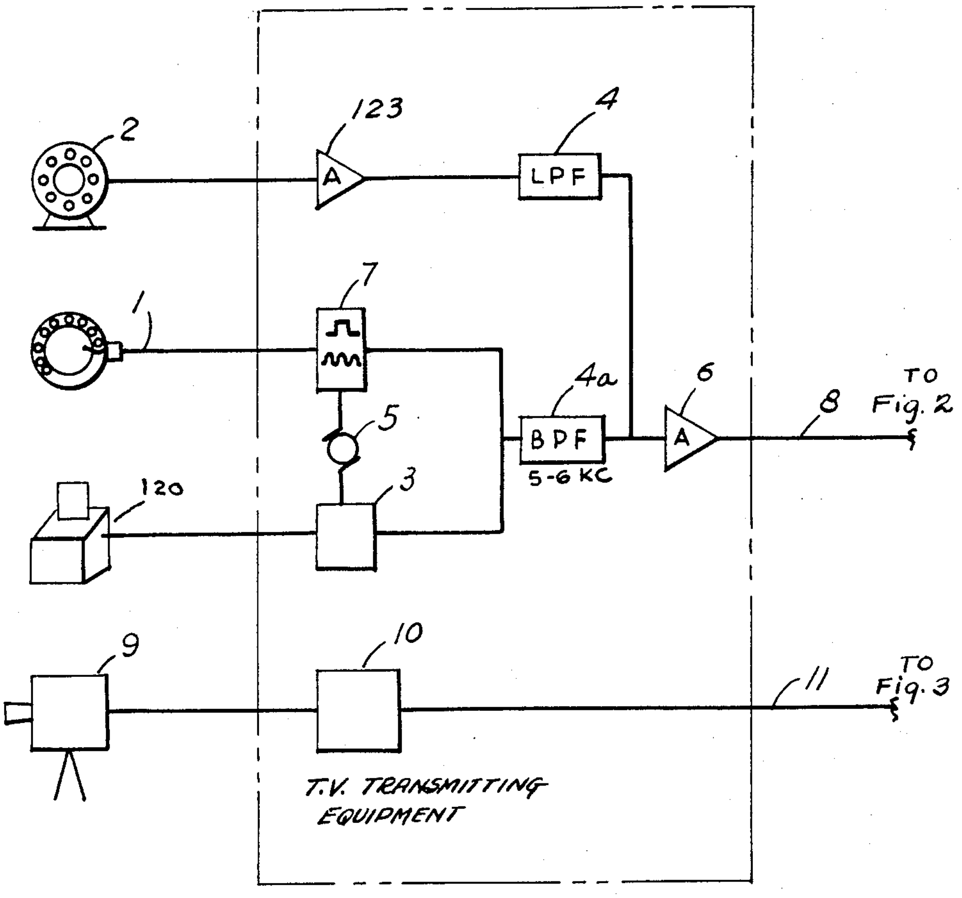
FIG. 1 is a schematic showing of the central control office and all of its enabling and broadcasting equipment.
Figure 2:
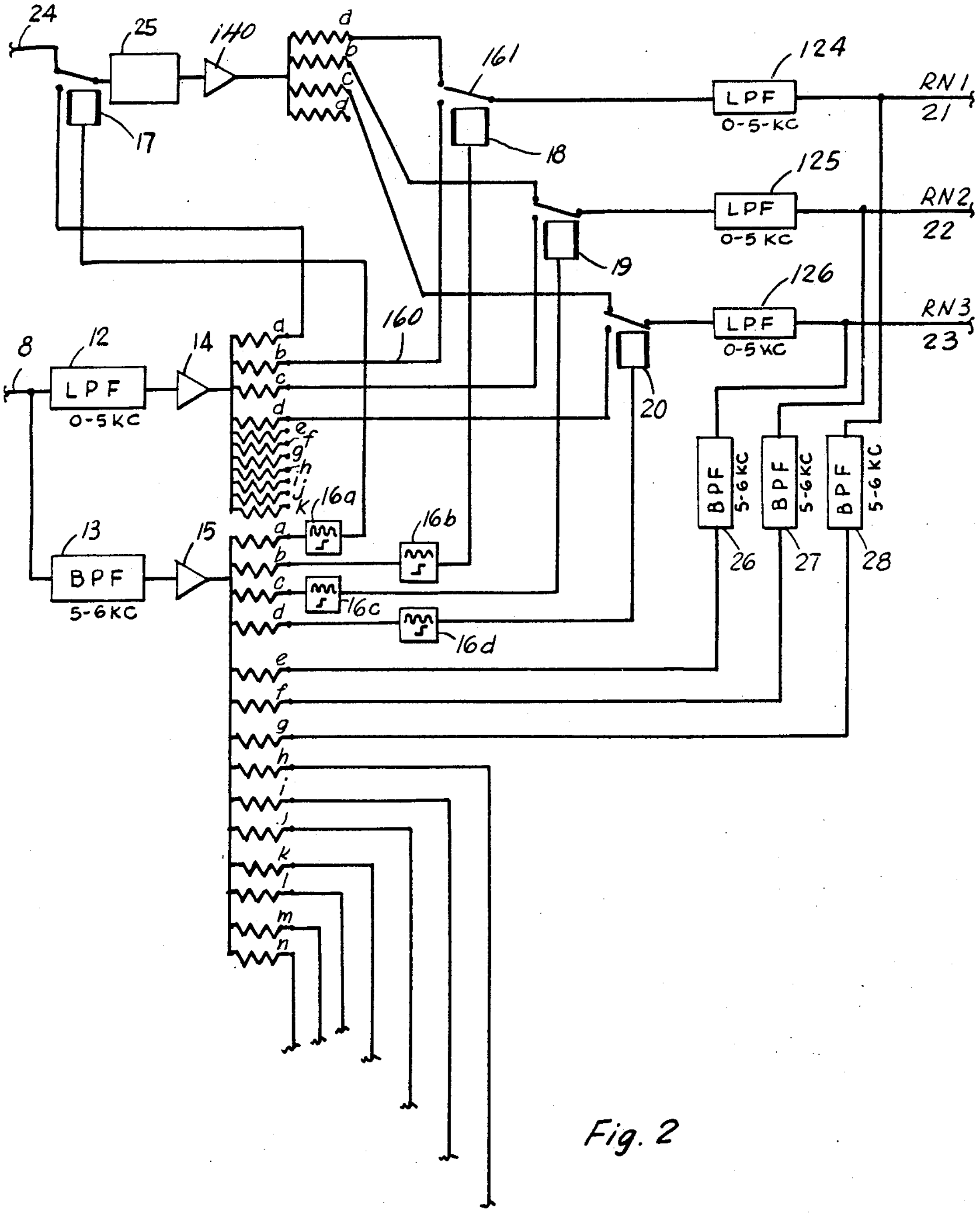
FIG. 2 is a schematic drawing of the system which operates the various switching apparatus necessary to operate the system.
Figure 3:
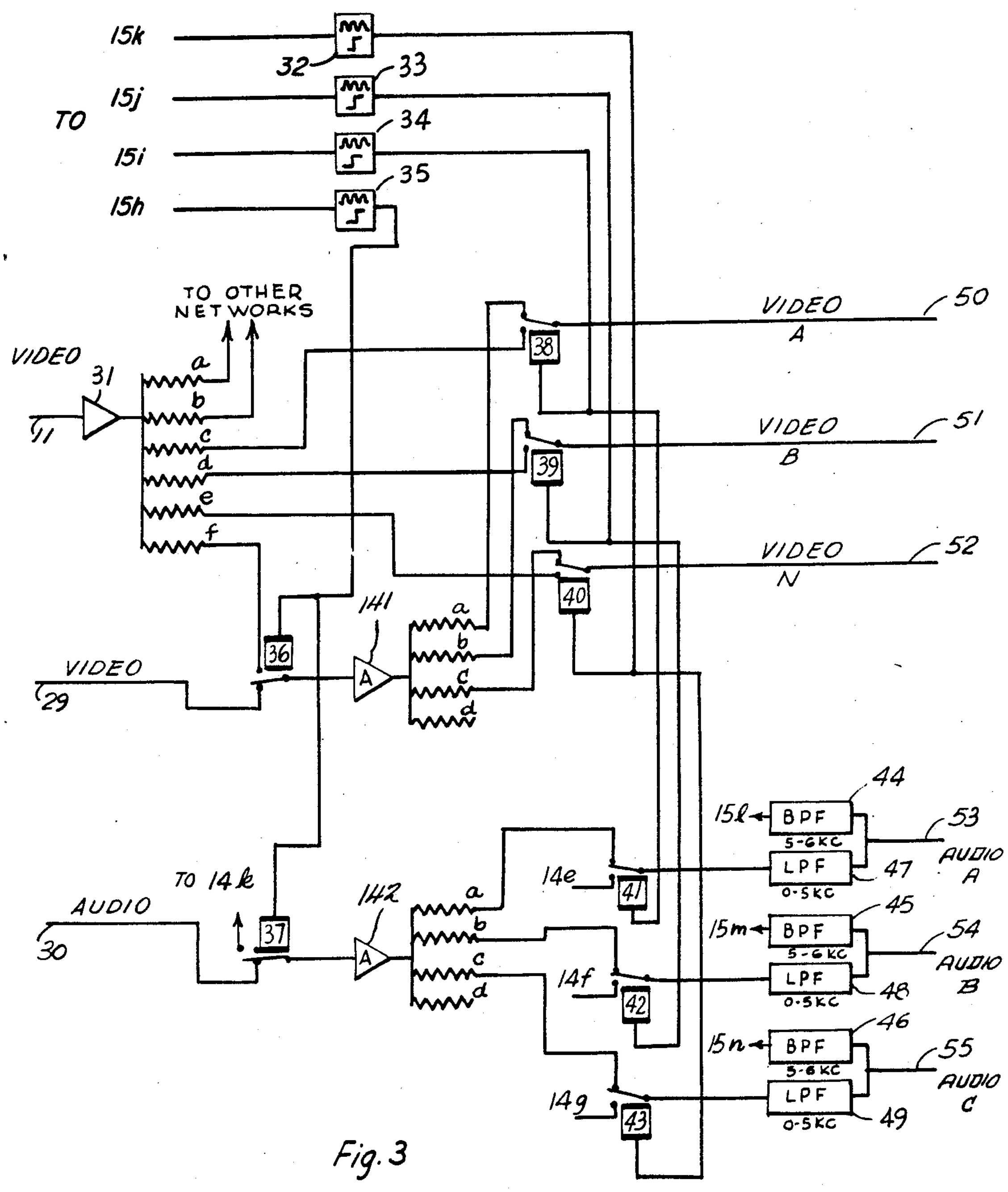
FIG. 3 is a schematic drawing of that portion of the system which activates the video and audio broadcasting equipment necessary for television communication.
Figure 4:
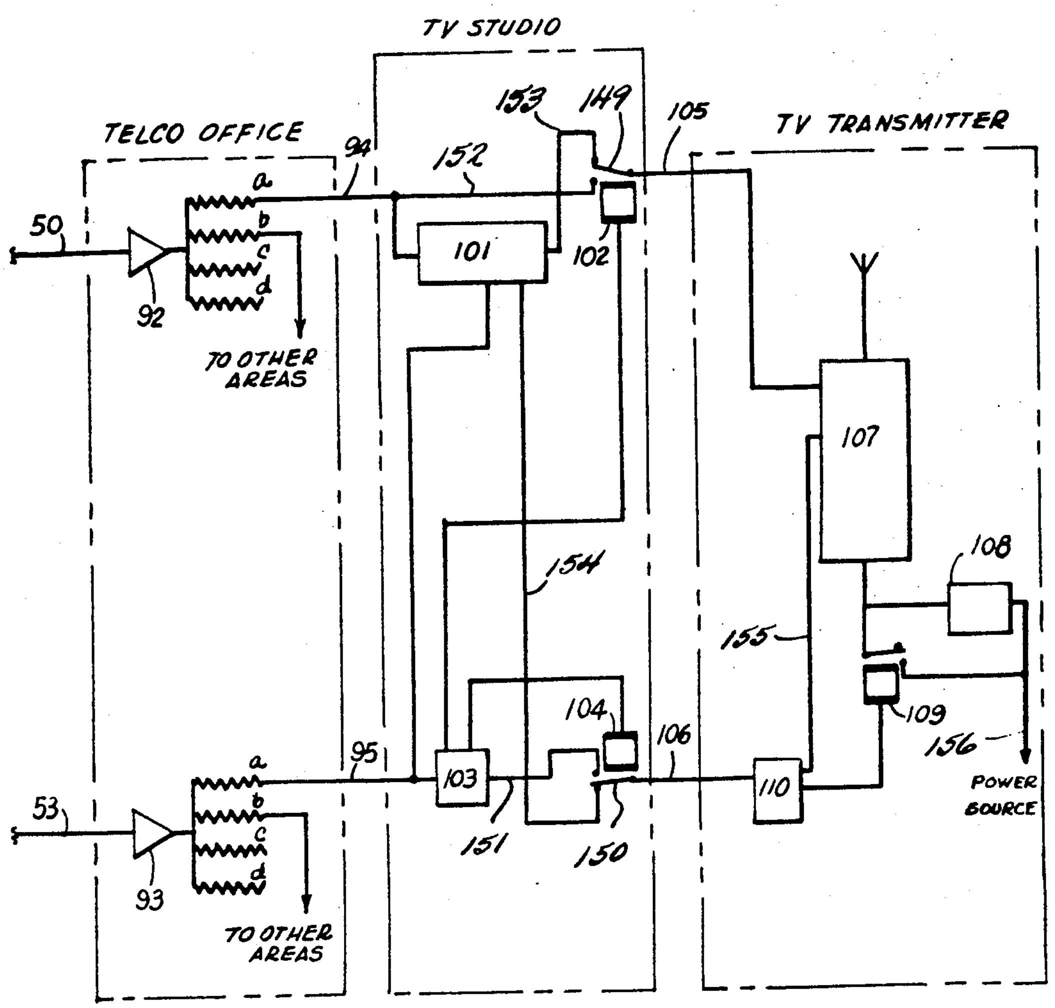
FIG. 4 is a schematic showing of that portion of the system which deactivates a regular television transmitting studio and inserts through its transmitting apparatus its own audio and video program signals.

The system will now be described in specific detail referring to the drawings which present only a specific embodiment of the system as it may operate. They should not, therefore, be considered as a limitation of the invention. To communicate from the central control point, in order that the information desired to be communicated will be transmitted through the radio receivers presently available, specific reference is made to FIGS. 1, 2, 5A, 6A, 6B and 7A. In FIG. 1, pulse generator 1 can be a regular telephone dial or any other type of pulse generator signal which can provide a specific and unique code of D.C. dial pulses. These pulses can also be a combination or sequence of tones which are transmitted and modulated at a particular preselected frequency or they can consist of a specific and unique coded series of binary digits, where "1" represents an on signal and "0" an off signal. For instance, if only a section of the radio network is desired to be activated, a binary signal such as 101101 can be generated and transmitted. If the television network is desired to be activated, a binary signal such as 001011 can then be generated and transmitted. It can be appreciated then that a number of specifically and uniquely coded series of pulses or tones can be generated to control the operation of the system. These coded control pulses, if generated in their proper sequence, will activate the element components of the system, as will be described hereafter. These pulse signals are coupled to convertor 7 which converts them to a multi-frequency signal having a frequency range between 5 and 6 kilocycles. These signals are then transmitted through band pass filter **4*a* and amplifier 6 to line 8. In FIG. 1, there is also shown a microphone 2 through which the audio information desired to be transmitted can originate. The audio information can be transmitted at a frequency in the 0 to 5 kilocycle range. The output signal of this microphone 2 is passed to amplifier 123 and then to low pass filter 4 where it is added to line 8 through amplifier 6. This, of course, can be accomplished by connecting the outputs of the low pass filter 4 and band pass filter 4*a* to amplifier 6 by the use of a bridge circuit. The signal, which is now on line 8, is separated by the low pass filter 12 and the band pass filter 13. The low pass filter 12 is set to eliminate any signal received from line 8 above 5 kilocycles and band pass filter 13 is set to pass only those signals between 5 and 6 kilocycles. The output of band pass filter 13 is transmitted to a distributing amplifier 15, which transmits its pulse signal output to an electronic or electro-mechanical device 16*a*. Electronic device 16*a* can be composed of a frequency selective of pulse selective apparatus, which converts the unique pulse or tone signal received to an electrical signal. Upon receiving the coded sequence of control signals as heretofore described from pulse generator 1 through band pass filter 13 and distributing amplifier 15, electronic device 16*a* operates relay 17. When relay 17 is activated, it disconnects line 24, which can be an audio line from a studio found in the central control office and which may be used to broadcast other audio programs. The activation of relay 17 concurrently transmits the audio signal which passes through low pass filter 12, audio frequency amplifier 14, through output 14*a*, to the network broadcasting equipment 25. This operation allows for the broadcasting of any audio signal which originates from microphone 2. Since network broadcasting equipment 25 is generally found in the central control office, any broadcast emanating therefrom will be transmitted to any radio receiver throughout the system previously tuned to this broadcasting frequency. Network broadcasting equipment 25** includes telephone program lines which may be connected to various broadcasting station studios and transmitters.

Figures 5A, 5B, 5C:
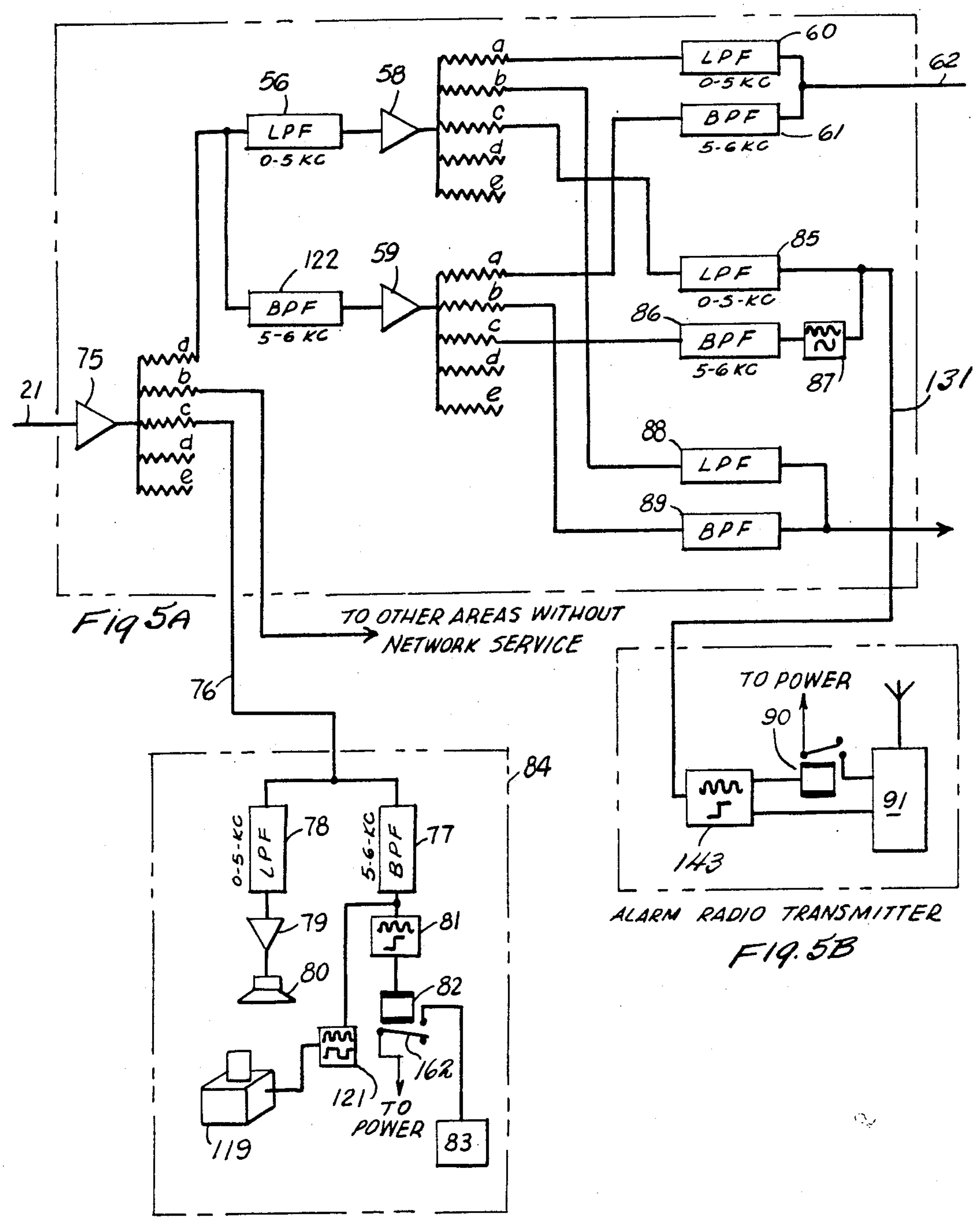
FIG. 5A is a schematic showing of that portion of the system which deactivates the regular radio broadcasting station and inserts therein the signal emanating from the central control point.
FIG. 5B is a schematic showing of that portion of the system which broadcasts a signal to enable the radio, television and pocket receivers to be activated.
FIG. 5C is a schematic showing of that portion of the system which enables the Civilian Defense Headquarters to be warned by the central control point.
Figures 6A, 6B, 6C:
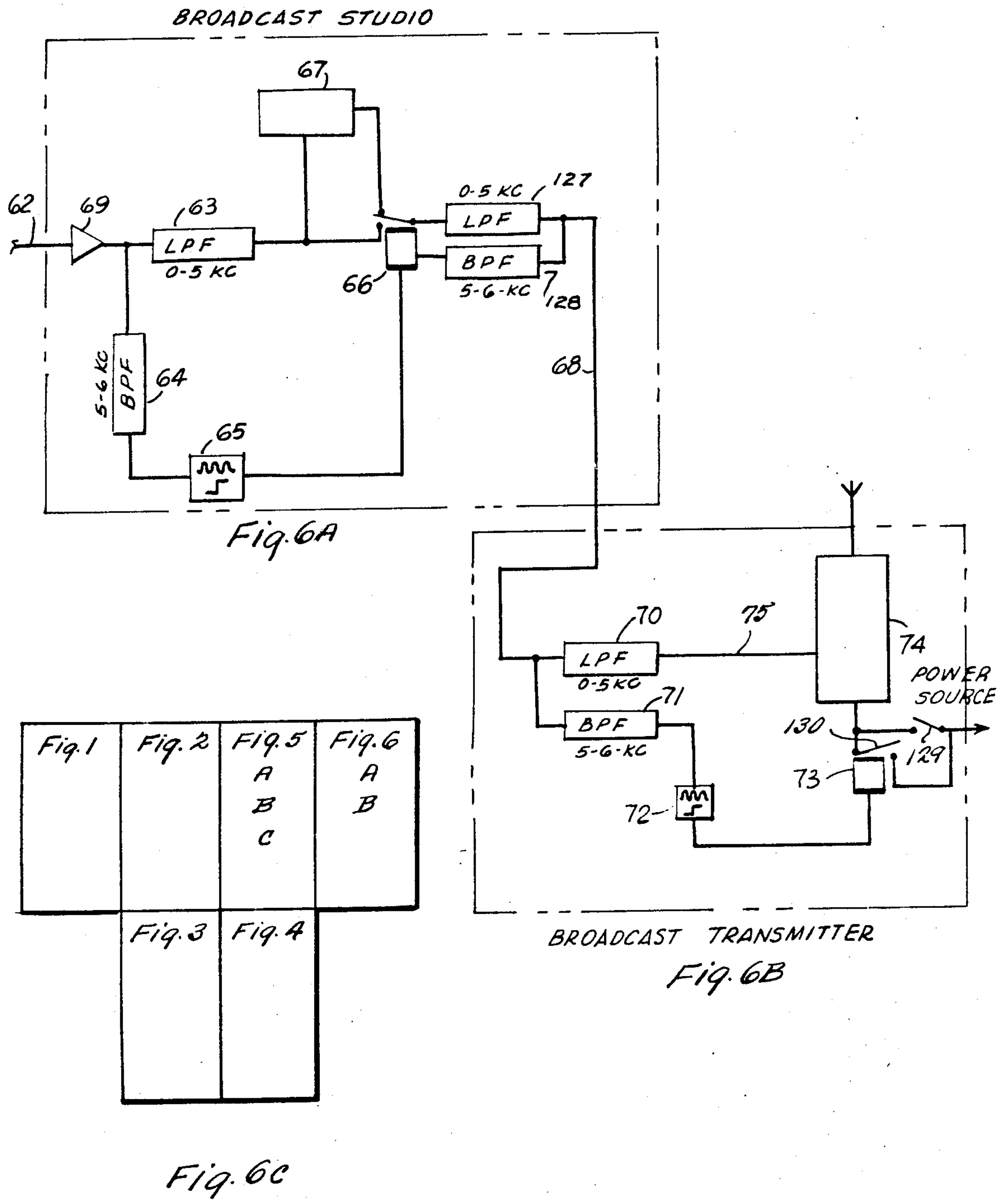
FIG. 6A is a schematic showing of that portion of the system which switches off the regular radio broadcast program and inserts therein the central control point program signal.
FIG. 6B is a schematic showing of that portion of a transmitter which is turned on thereby enabling it to broadcast the program information originating from the central control point.
FIG. 6C is a block diagram showing how the various figures of the drawings are interrelated.

Other remote broadcasting studios such as shown in FIG. 6A can be activated to transmit messages or information originating from the central control point by the following sequence of steps. The activation of relay 17, with the corresponding transition of network broadcasting equipment 25 from an independent broadcast to an audio signal originating from the central control point, has already been discussed above. Assuming, therefore, that the coded control pulses signal has been transmitted from the central control point network broadcasting equipment 25, the signal emanating therefrom will be transmitted to amplifier 140 which is a voice frequency amplifier similar to amplifier 14. The output of amplifier 140 issues from output **25*a*. This signal then passes to low pass filter 124 and line 21. From there, as shown in FIG. 5A, the signal will pass to distributing amplifier 75, subsequently to be transmitted through low pass filter 56, via output 75*a*, amplifier 58, output 58*a* to low pass filter 60 then to line 62 and amplifier 69. The signal existing at the output of amplifier 69 will be a combination of two signals, one being the audio portion of the signal originating in the central control point and the other being the coded pulse control signal generated at the central control point by pulse generator 1, which will enable relay 66 to eliminate from the broadcasting network, the broadcasting studio depicted as block 67. This coded pulse control signal can be traced from the pulse generator 1 located at the central control point through convertor 7, band pass filter 4*a*, amplifier 6, line 8, band pass filter 13, distributing amplifier 15, output 15*g*, band pass filter 28, line 21, to amplifier 75 through band pass filter 122, distributing amplifier 59, amplifier output 59*a*, band pass filter 61, line 62, through amplifier 69, band pass filter 64, electronic or electro-mechanical device 65, equivalent to element 16*a*, which converts the coded control sequence of pulses to a signal that operates transfer relay 66. When transfer relay 66 is activated, it transfers, as previously noted, the regular broadcast line from broadcasting studio 67 to the output of low pass filter 63. The audio signal originating at the central control point can then be passed through low pass filter 127, to line 68, low pass filter 70, line 75 and transmitter 74**.

This transmitter is capable of transmitting the signal even if it is in an off condition when the signal originates from the central control point by the following sequence of events. The coded pulse control signal which activated transfer relay 66 will be passed to band pass filter 128, line 68, band pass filter 71, and the electronic or electro-mechanical device 72, which once again, converts the pulse signal to a signal capable of operating relay 73. Even if power switch 129 is in an off condition as shown in FIG. 6B, the transfer relay closes switch 130, thereby enabling transmitter 74 to broadcast the signal which originated from the central control point.

When the signal is transmitted by transmitter 74, any audio receiving equipment, even if the equipment is in an off condition, which is tuned to its broadcasting frequency is enabled to receive the signal so transmitted. This enabling procedure is accomplished by the coded control pulse sequence which is transmitted by transmitter 91 of FIG. 5B, after being developed in the following manner. The proper and unique control sequencing of pulses originates at pulse generator 1, located at the central control point. The uniquely coded control signal generation has been described heretofore. That sequence is converted through convertor 7 to a multi-frequency signal between 5 and 6 kilocycles, then passed through band pass filter 4*a*, amplifier 6, line 8, band pass filter 13, distributing amplifier 15, output 15*g*, to band pass filter 28, to line 21, through distributing amplifier 75, through output 75*a*, band pass filter 122, otput 59*c* of distribution amplifier 59, and through band pass filter 86 to electronic convertor 87, which is a frequency convertor changing the 5 to 6 kilocycle control pulse signal to a pulse signal having a frequency between 900 to 2,000 cycles per second. This converted signal of lower frequency is then passed to line 131 which passes signals with a frequency of cycles between 0 and 3,500, to electronic convertor 143 which changes the control pulse signals into an electrical signal capable of activating relay 90. This operation will activate transmitter 91, from a local power source to enable television or radio transmitter to receive the enabling signal from the central control point. The receivers, if in an off condition may now be enabled to receive the program signal originating at the central control point.

To activate only a certain portion of the system so that only that section of the country which is to be informed has its necessary equipment activated, substantially the same procedure is followed as for the activation of the complete system except that a different code of control pulses are generated from pulse generator 1 so that distributing amplifier 15 derives an output through 15*b*. This output activates element 16*b*, whereby relay 18 transfers the output from 140*a* to the output of 14*b*.

This will transmit the voice signal emanating from microphone 2 to low pass filter 124 and line 21 to be subsequently transmited to that region which is controlled by line 21. In substantially the same manner the other two regions of the country, depicted as RN2 and RN3, can be informed in a separate sequentially operated manner. This, of course, entails the variation of the coded sequence of control pulses so that the output of distributing amplifier 15*c* and 15*d* will be activated to thereby transfer the output of the regular audio signal of line 24, so that the voice signal transmitted through microphone 2 will be transmitted through voice amplifier output 14*c* and 14*d*. Only three sections are shown in the diagram as a matter of convenience. It is understood that more than three sectional networks can be used by merely adding the proper network elements necessary to practice the invention.

As previously stated, concurrent with the audio signal transmitted through microphone 2 located at central control headquarters, a video signal can also be transmitted therefrom by using a television camera 9, and television transmitting equipment 10. The operation of this system is now described by reference to FIGS. 1, 2, 3, and 4.

To activate the television network of the system, a coded sequence of control pulses is generated from pulse generator 1 and passed through convertor 7, band pass filter 4*a*, amplifier 6, line 8, band pass filter 13, and distributing amplifier 15. With the proper code of pulses, a control signal is generated by output 15*h* of the distributing amplifier 15. This signal from 15*h* is then transmitted to electronic device 35 which upon receiving the coded sequence of control signals operates relay 36 and 37, thereby eliminating from regular broadcasting apparatus any video and audio signal which may be regularly emanating from the central control point. This also prepares the system for receiving the video and audio portion of the signal desired to be broadcasted by the central control point. Relay 36 will transfer the video portion of the system from the regular video broadcast to that portion of the warning system which is transmitting the video signal. Therefore, the video signal emanating from the central control point being generated by television camera 9 transmitting equipment 10 will be transmitted via line 11 to multiple output video amplifier 31 through output 31*f*, video distributing amplifier 141, and lines 50, 51 and 52 to the related sectional broadcasting equipment (shown in FIG. 4). This operation transmits the video portion of the signal originating at the central control point.

The audio portion of the program signal is transmitted from microphone 2 while the video signal is being transmitted by television camera 9. The signal is forwarded to the video transmission system through the following circuit: from microphone 2 to amplifier 123, to low pass filter 4, then to amplifier 6, line 8, low pass filter 12, voice frequency, and distribution amplifier 14. The output of amplifier 14 will be placed on terminal 14*k*, so that relay 37, when activated, transfers the regular audio circuits from the line 30 to terminal 14*k*. This then enables the video and audio signal originating from the central control point to be transmitted throughout the network, and it will be received by any audio and video receiver previously enabled. The enabling procedure is similar to the procedure followed for enabling the audio receiving equipment as previously mentioned and described. Enabling pulses are, once again, transmitted through transmitter 91, which enable the television receivers shown by FIG. 7A. The enabling procedure has been described, as one which will turn on a receiver, even though it may be in an off condition at the time the central control point begins to transmit its program signal. It can be seen from FIG. 7A that the audio and video receivers are capable of receiving a signal transmitted by transmitter 91, through receiver 96 which is tuned to the same frequency as transmitter 91. The signal receiver at receiver 96 is passed via line 144 to an electronic or electro-mechanical device 97, which converts the coded pulse signal so received to an electrical signal capable of activating relay 98. With the activation or relay 98, if the receiver is in an off condition, which is the state shown in FIG. 7A, the relay 98 reverses the state of switches 145 and 146. Switch 146 is a by-pass device for supplying power to the receiver, thereby by-passing the on-off switch shown at 100. Switch 145 controls the audio level of the receiver. As can be seen from FIG. 7A, even if the audio level is turned off at a lower volume shown by the rheostat 99, and volume control 147, switch 145 will place the audio volume at a much higher volume as shown by volume control 148.

Therefore, it is apparent that by using this invention, radio and television receivers are enabled to receive a program signal generated from the central control point even though they may be in an off condition and it further enhances the applicability of the system as a warning device since it not only turns on the receiving apparatus, but it also places the volume control at a higher level than that to which it was previously set. It can be readily ascertained that this type of switching arrangement can be made operable with all radio and television receivers.

It was also previously discussed that television signals, both audio and video, could be originated and broadcasted from the central control point to enable all sections of the network to receive the signals. However, this invention is also applicable to enable the central control point to visually communicate with only a particular section of the network. This sectional television communication is accomplished similarly to the sectional communication described for the audio portion of the system. To communicate with only a particular section in this instance (in FIG. 3 the sections are designated A, B and N), the following procedure must be followed.

When the coded and unique series of control pulses is generated at the central control point through pulse generator 1 those pulses are transmitted through convertor 7, band pass filter 4*a*, amplifier 6, line 8, band pass filter 13, and distributing amplifier 15. An output from amplifier 15 occurs at terminal 15*i* and activates relay 38 through electronic device 34. Concurrently relay 41 is also activated so that audio signals are also transmitted to section A of the network. The activation of relays 38 and 41 effect transmission of audio and video signals to section A. The video signal is channeled from television camera 9 through transmitting equipment 10, line 11, video distributing amplifier 31, output 31*c* and line 50. From microphone 2, the audio signal passes through amplifier 123, low pass filter 4, amplifier 6, low pass filter 12, voice frequency and distributing amplifier 14, output 14*e*, low pass filter 47 and line 53. When the video and audio signals are on lines 50 and 53, respectively, the sectional television transmitters disposed at a distance remote from the central control point are capable of transmitting the program signal originating from the central control point and which is now found on lines 50 and 53. This is accomplished by extending the following sequence previously described. The audio signal on line 53 is a combination of signals including a program audio signal and a pulse control signal which is inserted therein from the output of distributing amplifier 15*l*, through band pass filter 44. It is understood, of course, that the uniquely coded control pulse sequence must be generated from the central control point so that the control signal can be forwarded from output 15*l* of distributing amplifier 15. This combination of signals on line 53 is passed to amplifier 93 which is also a distributing amplifier. The output for this instance (i.e., controlling only section A) is on terminal 93*a* which passes via line 95 to an electronic device 103, which in essence is a convertor, converting the pulse control signal into an electrical signal capable of operating relays 104 and 102, but it also passes through the audio signal to line 106.

Therefore, when the proper coded sequence of pulses is generated from pulse generator 1 located at the central control point, relays 102 and 104 are activated to transfer the remote television transmitting apparatus from local control, which is shown as a regular television studio at 101 to the control of the central control point. Relay 102 transfers switch 149 from line 153 to line 152, thereby allowing the video signal found on line 50 to be passed through amplifier 92, amplifier output 92*a*, line 94, line 152, line 105, to television transmitter 107.

Concurrently relay 104 transfers switch 150 from line 154 to line 151 thereby enabling the output signal of device 103 to be forwarded through lines 151 and 106 to an electronic device 110, which may include a discriminator and a filter. This is required since line 106 is forwarding a signal which includes two parts. One is the audio signal which is passed by line 155 through electronic device 110 to transmitter 107 for concurrent transmission with the video signal on line 105. The other signal found on line 106, jointly with audio signal, is the uniquely coded control signal which is sensed through a filter device and passed to relay 109.

Relay 109 is a by-pass device which allows transmitter 107 to operate even though the transmitter may be in an off condition. If transmitter 107 is in an off condition, indicating, therefore, that its power equipment 108 is shut down, the activation of relay 109 by-passes the off condition of equipment 108 and directly connects transmitter 107 to a power source 156.

It can be seen then that this system will enable the central conrtol point to communicate with the total network or only portions thereof by generating a unique code of control pulses, thereby enabling either the complete network to receive the communication from the central control point or only a specific section thereof.

Figure 7A:
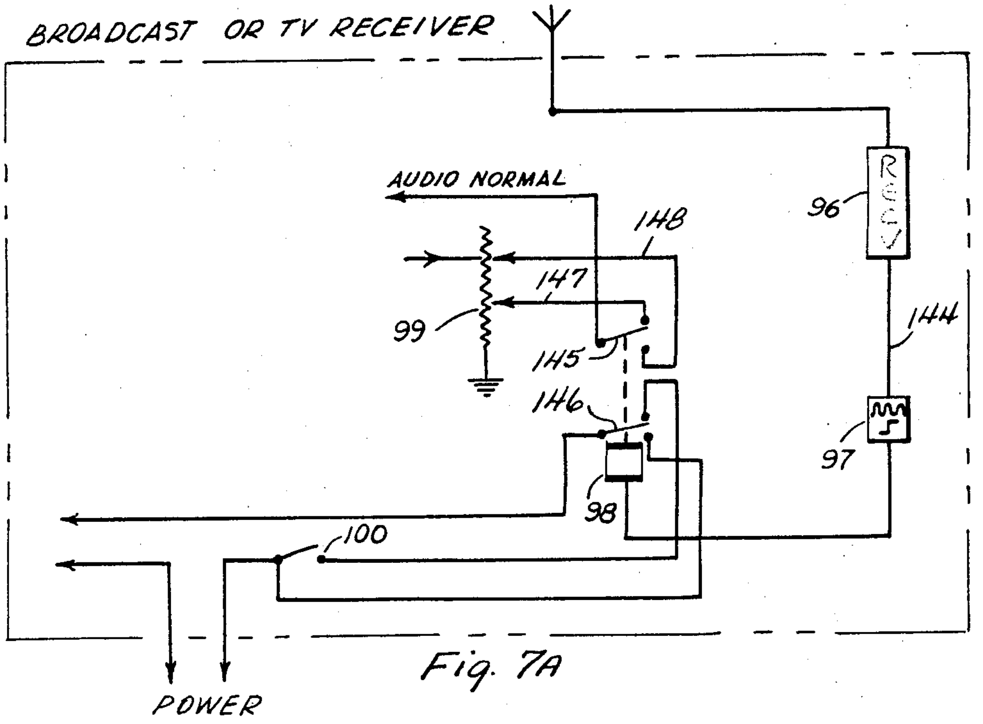
FIG. 7A is a showing of that portion of the system which operates the regular television or radio receivers, usually found in most homes of the general population.
Figure 7B:
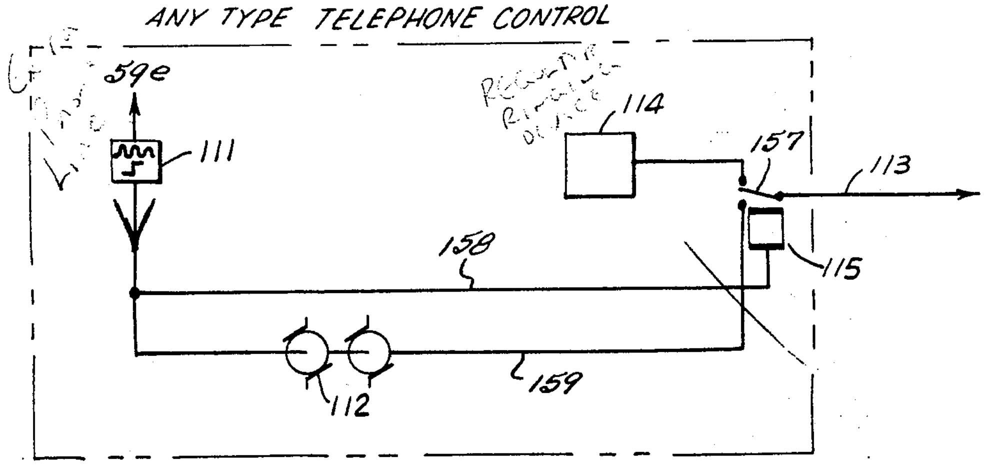
FIG. 7B is a schematic showing of that portion of the system which operates the home telephone.

Through the use of this invention the central control point can also communicate with various sections of the network having the normal telephone within their proximity. FIG. 7B outlines a ringing device 112 which can be installed in all telephone sets and which by the unique signal, being generated at the central pontrol coint, will activate ringing device 112, thereby giving a warning to all personnel located within the general proximity of the telephone set. This ringing device can be activated by generating the unique code of control pulses through pulse generator 1, convertor 7, band pass filter 4*a*, amplifier 6, line 8, band pass filter 13, distributing amplifier 15, output 15*g*, band pass filter 28, line 21, through amplifier 71 and amplifier output 75*a*, and then through band pass filter 122 and distributing amplifier 59. If the unique code of control pulses is generated from the central control point, distributing amplifier 59 issuses an output at terminal 59*e*. That output is a control signal which element 111 converts into an electrical signal capable of activating relay 115, this transfer switch 157 from the normal ringing device 114 to line 159, thereby inserting in the line the auxiliary ringing device 112, which commences to emanate a loud ringing in the telephone set to warn the personnel within the proximate area. Line 113 represents other telephone subscription lines which can be controlled and activated through line 59*e*. This warning system could also be incorporated to operate a ringing device at the central office of the telephone company. This specific adaptation of the system is not shown, but is would operate generally in the following manner. When the unique control pulse code is generated from the central control point, a ringing device, found in the central office of the telephone company, would warn the subscribers connected to this central office. This operation would necessarily include a ring relay and a switching relay, which will automatically ring all the subscriber telephones.

The network can also be used to warn and communicate with a civil defense headquarters or any sectional or district office in charge of civil defense. A civil defense office is shown in the drawings at FIG. 5C where the program signals from the central control point can be transmitted to it either through a general alarm device 83, a Teletype device 119, or a loud speaker device 80. The proper operation of these various devices is now described. When central control point desires to communicate with a civil defense office it can generate the unique series of pulses through pulse generator 1 which is forwarded through convertor 7, band pass filter 4*a*, amplifier 6, line 8, band pass filter 13, distributing amplifier 15, output 15*g*, band pass filter 28, line 21, amplifier 75, and output 75*c* to line 76. At line 76 there are two signals, one being the unique control signal generated as just described, the other being the audio program signal which originates from the central control point at microphone 2. This is placed on line 76 through the following sequence. The audio portion of this signal passes through amplifier 123, low pass filter 4, amplifier 6, line 8, low pass filter 12, and voice frequency amplifier 14, to output 14*b*. Relay 18 is activated by issuing from the pulse generator 7, concurrently with the audio signal being generated by microphone 2, a code of unique control pulses which pass through a circuit including convertor 7, band pass filter 4*a*, amplifier 6, line 8, band pass filter 13, distributing amplifier 15 and output 15*b* thereof, and electronic convertor device 16*b* to relay 18. This transfers switch 161 to line 160, thereby enabling the audio signal from microphone 2 to be transmitted through low pass filter 124, line 21, amplifier 75 and output 75*c* thereof to line 76. The audio signal then passes through low pass filter 78 and amplifier 79 to speaker 80 located within civil defense office thereby placing this section of the network in direct communication with the central control point. The uniquely coded control signal previously described as being on line 76 passes to band pass filter 77 through electronic convertor 81 which enables relay 82 to activate switch 162 thereby enabling the alarm device 83 to emit a loud tone warning anyone within the proximate area.

The central control point can also be in direct communication with civil defense headquarters through the use of a Teletype means by using the following sequence. The central control point transmits through Teletype transmitter 120 the regular mark and space signals which are generally emitted by a Teletype system. This Teletype signal passes to unit 3, which converts it to a multi-frequency signal between 5 and 6 kilocycles. This signal is then forwarded to band pass filter 4*a*, amplifier 6, line 8, band pass filter 13, distributing amplifier 15, output 15*g* thereof, through band pass filter 28, line 21, amplifier 75, output 75*c* thereof, through line 76, band pass filter 77 and converter 121 which reconverts the 5 to 6 kilocycle frequency signal to a D.C. mark and space signal capable of operating a teletype receiver.

The system could also be used to warn anyone having a pocket receiver (not shown) which is tuned to the frequency being transmitted through transmitter 91 shown in FIG. 5B. The pocket receivers could be made on a miniaturized scale so that they would not be uncomfortable to the wearer and could be worn any place on the person. They could also be capable of not only receiving an alarm signal, but of receiving an audio signal from the transmitter 91 where the program signal is being generated at the central control point.

The system could be operable at frequencies other than those mentioned, namely, 0–5 kilocycles for the program signal and 5–6 kilocycles for the coded control signals which were used merely for convenience in describing the invention. For instance, other frequencies could be used, such as program signals from 0 to 8 and 0 to 15 kilocycles and coded binary signals or tones in the 8 to 9 and 15 to 16 kilocycle range respectively.

The foregoing specific embodiments have been described for the purpose of illustrating the principles of this invention, and the same are subject to extensive change without departure therefrom. Therefore the invention includes all modifications encompassed within the spirit and the scope of the following claims.

We claim:

1. A national alarm warning system comprising:
means for generating unique control pulse signals,
distributing amplifier means for receiving, amplifying and distributing said control signals,
first switching means electrically connected to said amplifier means so as to be shifted from a first to a second condition by the control signals distributed by said distributing amplifier means,
a first broadcast means connected to said first switching means so as to be deactivated when said first switching means is in said second condition,
a second broadcast means connected to said first switching means so as to be activated when said first switching means is in said second condition,
a central control means capable of generating an audio signal to be transmitted by said second broadcast means over the network elements of said first broadcast means,
second switching means for receiving said control signals and operable in response to said control signals,
third broadcasting means connected to said second switching means and operably deactivated by said second switching means so that the audio signal from said second broadcasting means can be transmitted over the network elements of said third broadcasting means, and
means for transmitting said audio signal from said second broadcast means to said third broadcast means.

2. A system as in claim 1, wherein said control pulse signals are modulated in the 5 to 6 kilocycle frequency range, and said audio signals originating from said central control point are modulated in the 0–5 kilocycle frequency range.

3. A system as in claim 1, wherein said pulse signals are modulated in the 8–9 kilocycle frequency range, and said audio signals originating from said central control point are modulated in the 0–8 kilocycle frequency range.

4. A system as in claim 1, wherein said first, second, and third broadcasting means are capable of broadcasting only audio signals.

5. A system as in claim 4, including video broadcasting means located at said central control means which will transmit video information concurrently with said audio signals.

6. A system as in claim 1, including a third switching means activated upon the reception of said control pulse signals and a secondary telephone ringing means activated by said switching means whereby said secondary telephone ringing means will be capable of transmitting information originating from said central control means.

7. A system as in claim 1, including a third switching means activated upon the reception of said control pulse signals, and
a video and audio broadcast receiver means which will be activated upon receiving said pulse signals, thereby enabling it to audibly and visually regenerate the information emanating from said central control means.

8. A system as in claim 7 including means for activating said video and audio broadcast receiver means at a higher audio volume than previously set, whereby the area within the proximity of said broadcast receiver will be warned by the information so received from said central control means.

9. A system as in claim 1, including a third switching means which is activated upon the reception of said pulse signals, and
an audio broadcast receiver means which will be activated upon receiving said control pulse signals, thereby enabling it to audibly regenerate the information emanating from central control means.

10. A system as in claim 9, including means for activating said audio broadcast receiver at a higher audio volume than it was previously set, whereby the area within proximity of said broadcast receiver will be warned by the information received from said central control means.

11. A national alarm warning system comprising:
means for generating information signals,
a pulse generating means for generating a distinct series of control pulses enabling the broadcasting and receiving sections of said warning system to perform their respective functions,
switching means for receiving said information and control signals and shifting from a first to a second electrical condition in response to said control signals,
broadcasting means connected to said switching means so as to receive said information signals for generating both an audio and a video signal from said information signal to be transmitted to all sections of said national warning system when said switching means is in said second condition,
Teletype means connected to said switching means so as to receive said information signals and for generating and transmitting mark and space signals to network areas equipped with Teletype receivers,
first receiving means connected to said switching means for receiving said audio and signal emanating from said information signal generating means when said switching means is in said second condition,
second receiving means connected to said switching means for receiving said audio and video signals emanating from said information signal generating means when said switching means is in said second condition, and telephone receiving means with auxiliary ringing means, connected to said switching means for receiving said control signals when said switching means is in said second condition and responsive to said control signals so that said telephone receiving means produces a constant ringing tone to give a warning signal to the proximate area.

12. A national alarm warning system as in claim 11 including switching means and second broadcasting means whereby said second broadcasting means located at remote points from said central control point are enabled to broadcast the audio and video signals originating at said central control point, through its own broadcasting equipment.

13. A national warning system as in claim 11 wherein said distinct series of pulses originating at the central control point are modulated at a 5 to 6 kilocycle frequency when said audio and video signals are modulated at a 0 to 5 kilocycle frequency range.

14. A national warning system as in claim 11 wherein said distinct series of control pulses originating at the central control point are modulated at a 8 to 9 kilocycle frequency when said audio and video signals are modulated at a 0 to 8 kilocycle frequency range.

15. A national warning system as in claim 11 wherein said distance series of control pulses originating at the central control point are modulated at a 15 and 16 kilocycle frequency when said audio and video signals are modulated at a 0 to 15 kilocycle frequency range.

16. A national warning system as in claim 11 wherein said distinct series of control pulses originating at said central control point are modulated and are being broadcast at a frequency between *m* and *n* kilocycles when said audio and video signals are being broadcast at a modulated *o* to *m* kilocycle frequency range.

References Cited

UNITED STATES PATENTS

| | | | |
|---|---|---|---|
| 1,580,409 | 4/1926 | Clement | 325—53 |
| 1,635,153 | 7/1927 | Clement | 325—54 |
| 2,626,348 | 1/1953 | Nobles | 178—5 X |
| 2,883,521 | 4/1959 | Curry | 325—53 X |
| 2,912,676 | 11/1959 | Canto et al. | 325—53 X |

OTHER REFERENCES

Electronics, September 1955, "Pulsed Tones Control A-M and F-M Stations," pp. 132–136.

Electrical Engineering, January 1959, "City-Wide Personal Signaling . . . ," pp. 49–52.

ROBERT L. GRIFFIN, Primary Examiner

B. V. SAFOUREK, Assistant Examiner

U.S. Cl. X.R.

178—6; 325—57, 183; 343—227